United States Patent [19] [11] 4,212,017
Tamai [45] Jul. 8, 1980

[54] DEFLECTION ELECTRODE ASSEMBLY FOR MULTI-NOZZLE INK JET PRINTERS

[75] Inventor: Masayoshi Tamai, Ebina, Japan

[73] Assignee: Fuji Xerox Co., Ltd., Tokyo, Japan

[21] Appl. No.: 967,758

[22] Filed: Dec. 8, 1978

[30] Foreign Application Priority Data

Dec. 8, 1977 [JP] Japan ............................... 52-146590

[51] Int. Cl.$^2$ ............................................ G01D 15/18
[52] U.S. Cl. ........................................................ 346/75
[58] Field of Search .......................................... 346/75

[56] References Cited

U.S. PATENT DOCUMENTS 3,060,429 10/1962 Winston ............................ 346/75 X

OTHER PUBLICATIONS

Haskell, J. W. et al., Deflecting Plate Assembly for Multiple Ink Jet Printer, IBM Technical Disclosure Bulletin, vol. 12, No. 11, Apr. 1970, p. 2001.

*Primary Examiner*—George H. Miller, Jr.
*Attorney, Agent, or Firm*—Sughrue, Rothwell, Mion, Zinn and Macpeak

[57] ABSTRACT

A multi-nozzle ink jet printer adapted to eject ink droplets from arrays of nozzles and to charge the ejected ink droplets in a predetermined quantity. The charged ink droplets are deflected in the direction substantially parallel to the nozzle array so that the ink droplets can strike against a recording medium for printing. A deflection electrode assembly comprises a number of conductive wires stretched perpendicular to the nozzle array in a spaced relation, and the conductive wires are connected on alternate wires to form two groups between which a deflection voltage is applied.

4 Claims, 4 Drawing Figures

DEFLECTION ELECTRODE ASSEMBLY FOR MULTI-NOZZLE INK JET PRINTERS

BACKGROUND OF THE INVENTION

This invention relates to improvements in an ink jet printer adapted to eject ink droplets against a recording medium for recording an information thereon in accordance with video signals. More particularly, it relates to a deflection electrode assembly for use in a multi-nozzle ink jet printer having a plurality of nozzles for high speed printing to control the direction of travel of ejected ink droplets under an electric field.

Systems for controlling the direction of travel of ejected ink droplets under an electric field can be grouped into two categories. A first type has nozzles equal in number to the number of the image units for each line and the deflection electric field is applied perpendicular to the nozzle array. A second type has nozzles in a lesser number than that of the image units for each line and the deflection electric field is applied in the direction parallel to the nozzle array. This invention is more specifically concerned with the second type deflection electrode unit. It is important with the deflection electric field that the intensity of the electric field be set uniformly over all of the nozzles and that the deflection electrode be kept free from dust.

Plate-shaped electrodes have been used as deflection electrodes for controlling the direction of travel of ink droplets, but it has been found that they have the tendency to be soiled with ink mist existing in the injected ink droplets or generated when the injected ink droplets strike against a recording medium. Particularly where a number of electrode pairs are arranged in the same direction of the nozzle array, the distance between the adjacent electrode plates are extremely reduced and it is very difficult to produce such an electrode plate array. In addition, the distance between the electrode plates becomes irregular to cause disturbances in the generated electric field when ink sticks to and laminates on the deflection electrodes. This causes the print position to be offset on the recording medium, resulting in poor quality print as well as discharge or shorts through the laminated ink. Also, it is difficult to scrape the ink off the electrode plates without disassembling and washing them.

In the prior art a jet ink printer assembly using jet deflection by an electrical field is disclosed in Japanese Utility Model Laid-Open publication No. 47-21628. In that prior art system a plurality of jet ink nozzles are aligned on a support member. An accelerating electrode is interposed between the nozzles and the electrical deflection apparatus. A voltage is applied between the nozzles and the accelerating electrode to cause the release pattern to be a fine stream of charged particles. Deflection of the stream by the deflection apparatus causes the jets to impact the recording medium in the desired printing orientation. A conductor is arranged at ends of the nozzle support member to adjust the applied voltage and therefore the electric field between the nozzles and the accelerating electrode.

SUMMARY OF THE INVENTION

Therefore, the present invention has a primary object to provide a deflection electric field generating system which can be kept free from soil to obtain uniformity of the electric field intensity for a long use.

The present invention utilizes a number of conductive wires stretched with a constant space instead of plate-shaped electrodes.

DESCRIPTION OF THE PREFERRRED EMBODIMENTS

Figure 1:
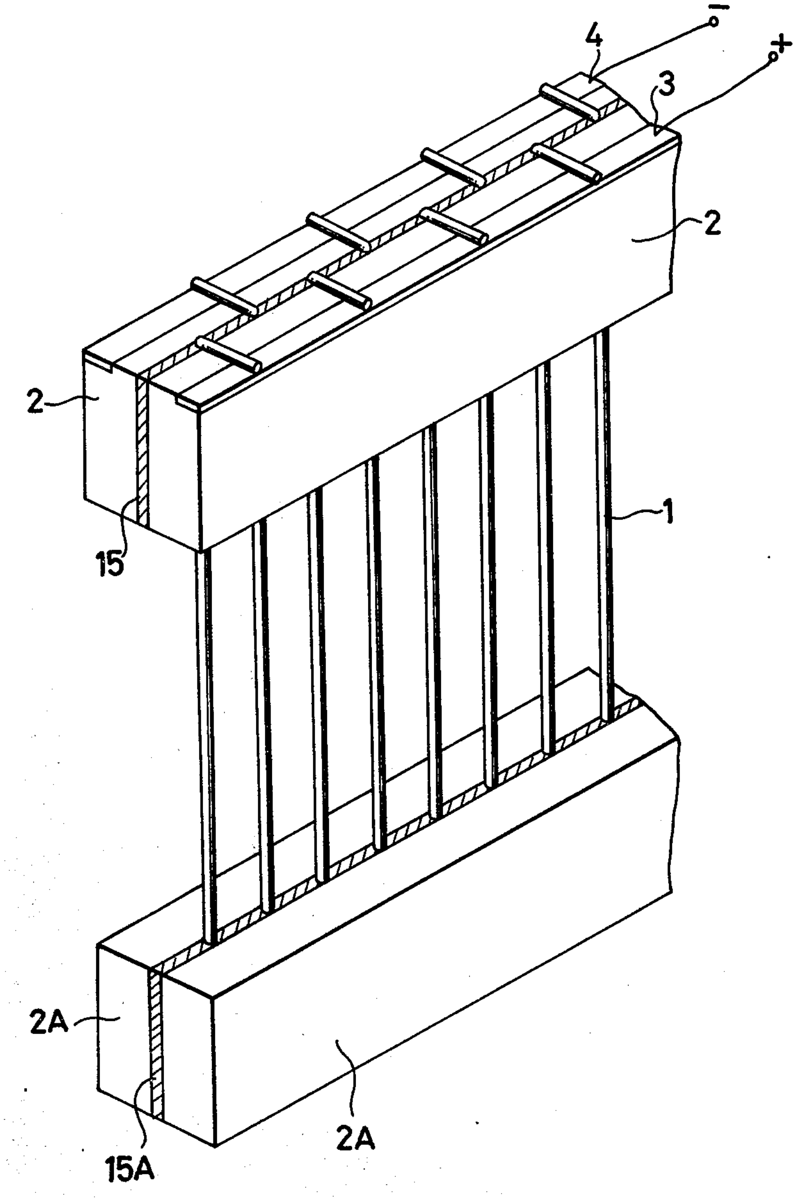
FIG. 1 is a schematic perspective view showing one embodiment according to the present invention.

FIG. 1 schematically shows one embodiment according to the present invention in which a deflection electric field is created between the positive and negative electrodes of the conductive wires alternatively arranged. Preferably, the conductive wires 1 comprise wires covered with an insulating material. The positive and negative conductive wires are respectively connected to terminal plates 3 and 4 which are provided on part of the holder 2 made of an insulating material and in turn is connected across a voltage supply. Although the negative and positive conductive wires are shown as connected to the terminal plates loacted in the opposite sides, the terminal plates may be located in one side with an insulating film. In the figure, the reference numerals 15 and 15A designate fillers such as adhesive, resins, or the like for filling the gap between the holder pieces. It is to be understood, however, that such fillers may not be used and the holders 2 may be formed as a unit.

Figure 2:
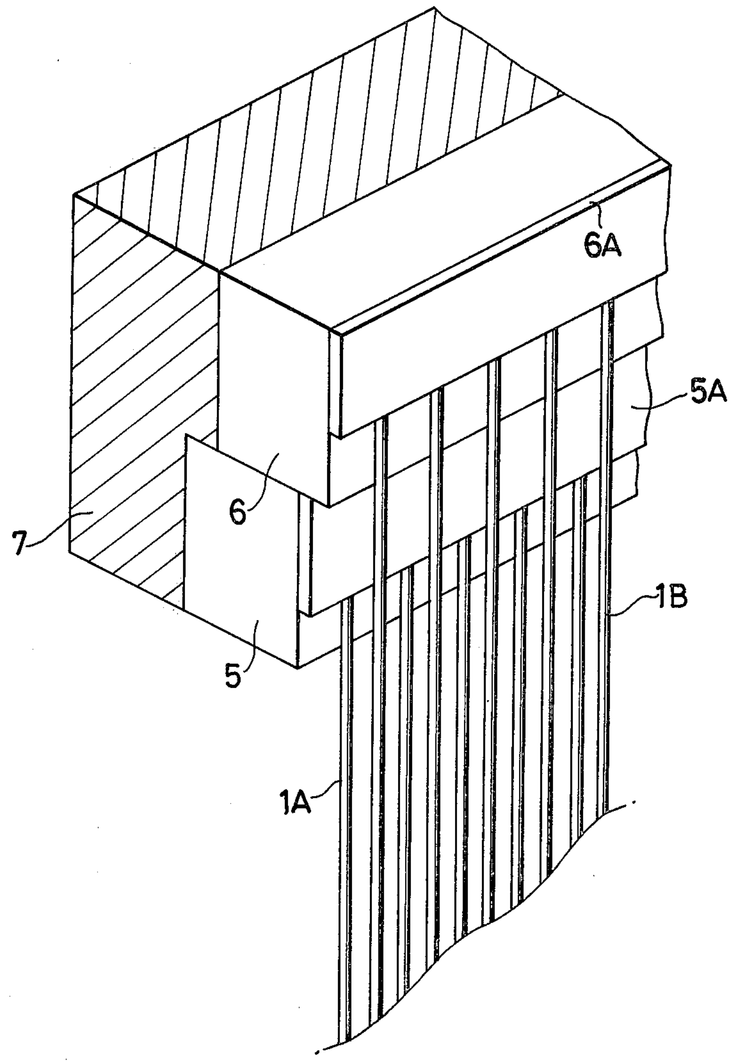
FIG. 2 is a fragmentary perspective view showing an alternative embodiment according to the present invention.

Although the present invention has been described above in connection with an assembly having a single deflection electrode unit, two deflection electrode units may be arranged along the path of travel of the ink droplets as illustrated in FIG. 2, where the lower holder and terminals are omitted for convenience of illustration. First and second deflection electrode units 1A and 1B are respectively retained by first and second holders 5 and 6 and are respectively connected through terminal plates *5a* and *6a* 1 to voltage sources in the same manner as described above. In this case, it is preferable that the distance between the deflection electrode units be maintained by securing the holders 5 and 6 to the stepped portion of the holder 7 as shown in FIG. 2. This arrangement is advantageous in that the deflection electric field relative to the ink droplets can be intensified.

Figure 3:
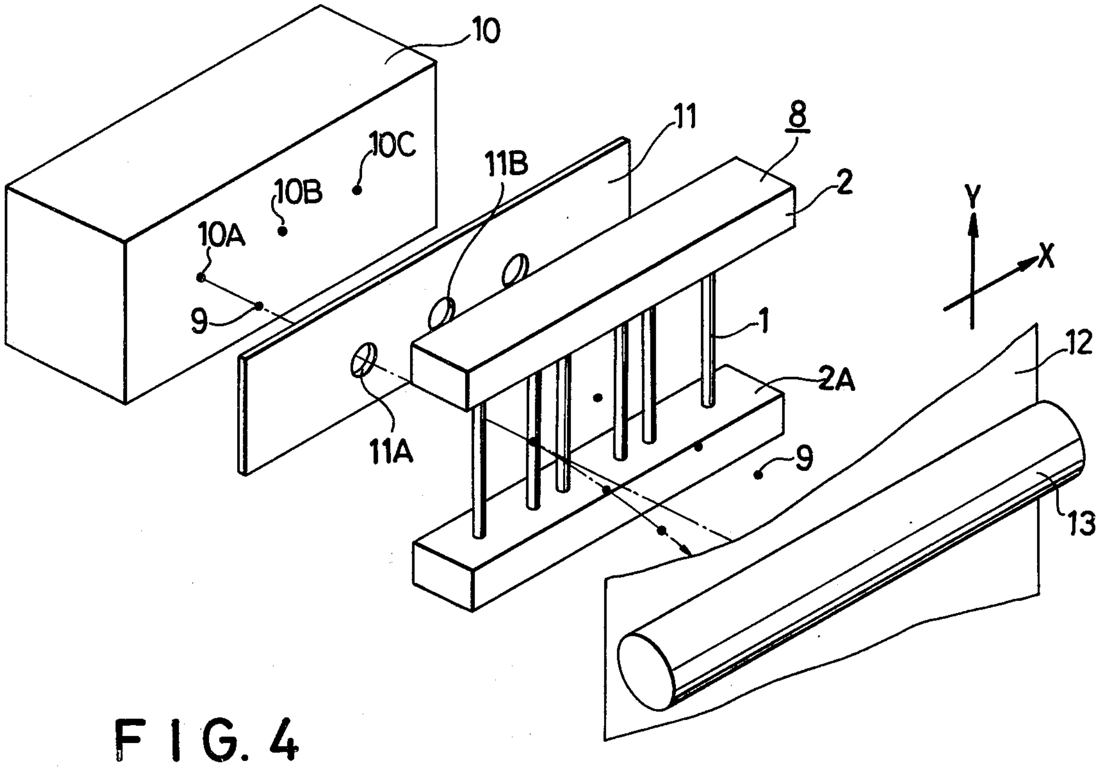
FIG. 3 is a schematic perspective view showing an application of the deflection electrode assembly of the present invention to a multi-nozzle ink jet printer.

FIG. 3 illustrates an application of the deflection electrode assembly 8 according to the present invention to an ink jet printer 10. In this arrangement, ink droplets 9 are ejected from an array of nozzles 10A, 10B, . . . of an ink ejection head 10 and charged when passing through the tunnels 11A, 11B, ... of a charging electrode 11. Thereafter, the charged ink droplets 9 are deflected in the direction of feed of a recording medium 12 (Y-direction) and vertically thereof (X-direction) by means of the deflection electrodes 1 so that they strike against the recording medium 12 to form a dot pattern. The reference numeral 13 designates a platen roll at the rear of the recording medium.

Figure 4:
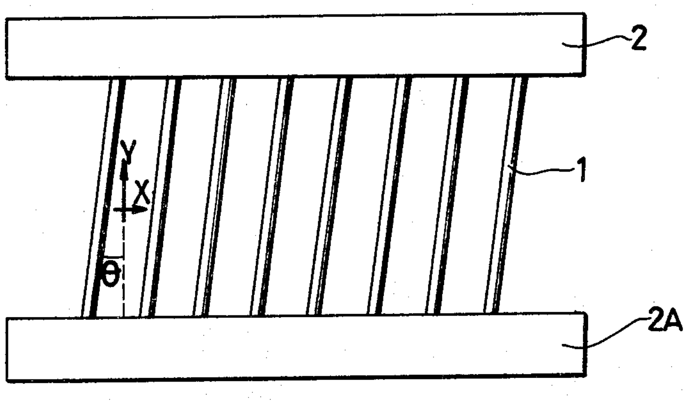
FIG. 4 is a plan view showing another embodiment according to the present invention.

While the recording medium continues to run during printing operation, printing distortion occurs in the Y-direction by movement of the recording medium 12. In order to compensate for such printing distortion, the respective deflection electrodes 1 of the deflection electrode assembly 8 is inclined slightly relative to the Y-axis. As an example, FIG. 4 illustrates an arrangement where the holders 2 and 2A holding the upper and lower ends of the deflection electrodes 1 are parallel and also parallel to the direction of the multi-nozzle array provided perpendicular to the direction of feed of the recording medium. The respective deflection electrodes or conductive wires 1 are inclined at an angle of $\theta$ relative to the direction perpendicular to the multi-nozzle array (Y-direction); that is, the deflection electrodes makes an angle of $\theta$ with the direction of feed of the recording medium. The angle $\theta$ is determined by parameters such as the velocity of injected ink droplets, the intensity of the deflection electric field, the velocity of feed of the recording medium, and the like. It is to be understood, of course, that the upper and lower holders 2 and 2A are suitably fixed to a suitable frame so that the conductive wires 1 are stretched with a predetermined tension.

In accordance with the present invention, it becomes easy to arrange the deflection electrode conductive wires with an extremely narrow space so as to provide a more uniform deflection electric field. In addition, the amount of ink mist sticking to the electrodes is reduced to minimize the occurrence of deflection electric field disturbances, discharge, and short.

It is apparent that other modifications of this invention are possible without departing from the essential scope thereof.

I claim:

1. In a multi-nozzle ink jet printer adapted to eject ink droplets from an array of nozzles along a path to a recording medium moving in a direction perpendicular to a first plane containing said array and said path, said droplets being charged and deflected in a direction substantially parallel to the array of nozzles whereby said ink droplets strike against said moving recording medium in a predetermined position, the improvement comprising at least two deflection electrode assemblies spaced apart along the path of said droplets; each assembly having a plurality of parallel conductive round wires disposed in a second plane perpendicular to said first plane in a spaced relationship from said nozzle array, said conductive wires being alternately charged to form two groups of conductive wires between which a deflection voltage is applied.

2. The improvement of claim 1 wherein each assembly comprises upper and lower holders between which said conductive wires are stretched.

3. The improvement of claims 1 or 2 wherein said conductive wires of each assembly are inclined in a direction away from the perpendicular to said first plane.

4. The improvement of claim 3 wherein said holders each of assembly comprise insulators, a positive terminal strip on one holder coupled to one of said groups of conductive wires and a negative terminal strip on one holder coupled to the other of said groups of conductive wires.

* * * * *